March 16, 1965  E. J. ZAHURANEC ETAL  3,173,712
O-RING OR GASKET SEAL, TAPERED PIPE THREAD MALE CONNECTOR
Filed April 13, 1961

*INVENTORS.*
EMERY J. ZAHURANEC &
ERLING G. WENNERSTROM
BY

*Fay & Fay*
ATTORNEYS

United States Patent Office 3,173,712
Patented Mar. 16, 1965

3,173,712
O-RING OR GASKET SEAL, TAPERED PIPE
THREAD MALE CONNECTOR
Emery J. Zahuranec, Solon, and Erling G. Wennerstrom,
Cleveland, Ohio, assignors to Crawford Fitting Company, Cleveland, Ohio, a corporation of Ohio
Filed Apr. 13, 1961, Ser. No. 102,823
1 Claim. (Cl. 285—355)

This invention relates to tube fittings generally, and more particularly to leak-proof fittings adapted for use in connection with tapered pipe threads in pressure fluid conducting systems.

Heretofore, considerable difficulty has been had with couplings and connectors that have standard tapered pipe threads due to the fact that it is substantially impossible to accurately predetermine the depth to which the fitting must be screwed in the threaded bore to provide the desired fluid seal. This is because the depth of the fitting is greatly affected by small variations in thread form, diameters of bore and body, and starting point of each of the threads. As a result, each of the fittings had to be custom made to achieve a fluid-tight fit, which is contrary to the standards of economy sought to be achieved by mass production methods.

Also, messy pipe thread sealing compounds referred to as pipe dopes or goops had to be used with the pipe fittings to assure a fluid-tight seal. This not only is expensive and time consuming, but the presence of contaminating dope or goop in the fluid conducting systems, such as lines used for drinking water, mercury, vacuum, etc., is highly undesirable.

Another important disadvantage of using standard tapered pipe threads in tube couplings or connectors resides in the over-tightening of fittings in order to overcome leakage at the joints. This results in damaged threads, cracking or distorting of valve bodies or other units connected in the fluid circuit, and the impossibility of repeatedly assembling and disassembling a connection for an indefinite but reasonable period of time.

As a result of the foregoing difficulties and disadvantages of using standard tapered pipe threads, the use of straight or bolt-type threads has been resorted to. Invariably, the straight or bolt-type thread fitting is accompanied by a packing ring or gland which, in many instances, is an expensive composite affair that is difficult to manufacture and assemble. Also, the packing rings or glands have been found to be easily lost from the fitting and hard to keep in proper position while the fitting is being assembled and tightened.

Therefore, one of the principal objects of the invention is to provide a fitting which utilizes tapered pipe threads but which does not have the above disadvantages.

Another important object of this invention is the provision of a fitting utilizing tapered pipe threads in combination with a sealing ring and constructed in such a manner that a fluid-tight and vacuum-tight joint is easily and economically effected.

Another object of the invention is the provision of a fitting such as that referred to in the preceding object, that can be disassembled and reassembled an indefinite number of times without fear of damage to the threads or the seal and still have the assurance of a fluid-tight or vacuum seal in each instance, without moving deeper and deeper into the mating threads each time a connection is made.

Another object of this invention is the provision of a fitting employing special tapered pipe threads wherein a special fit into existing pipe threads is provided by making the pitch diameter of the male pipe thread a gauge smaller than what would be the normal pitch diameter of the male threads for a given female pipe thread.

Still another object of the invention is to not only reduce the size of the pitch diameter of the male threads for a given female thread, as set forth in the preceding object, but also to shorten the length of the male member by reducing the number of thread turns thereon. One of the advantages attending this construction resides in the fact that the fitting seal can be effected even in the presence of imperfect pipe threads.

A still further object of the invention is the provision of a fitting utilizing tapered pipe threads, referred to in the preceding object, wherein a certain number of male threads have been relieved or recessed at the thread runout portion so as to allow the passing by of some of the outer female threads in order to properly seat the sealing ring against any juxtaposed flat surface.

Yet another object of the invention is the provision of fittings utilizing a sealing ring, such as an O-ring, with means for positively holding the sealing ring in assembly therewith and properly positioned so as to be ready for use when the fitting is to be assembled.

Another object is to provide a fitting utilizing tapered pipe threads as set forth in the preceding objects that does not require the use of pipe thread sealing compounds such as pipe dope or goop.

Another object is to provide a fitting utilizing tapered pipe threads as set forth in the preceding objects that seals at the same point each time a connection is made where, previous to this invention, pipe threads connections were screwed into one another deeper and deeper each time a connection was required to seal.

Another object is to provide a fitting utilizing tapered pipe threads as set forth in the preceding objects that will not strain or distort the body of the fluid pressure device and in some cases can actually stress burst the body unless extreme care is used in tightening standard tapered pipe thread fittings or joints.

The invention further resides in certain novel features of construction, and combinations and arrangements of parts, and further objects and advantages thereof will be apparent to those skilled in the art to which it pertains from the following description of the present preferred embodiment thereof described with reference to the accompanying drawings in which similar reference characters represent corresponding parts throughout the several views, and in which.

Figure 1:
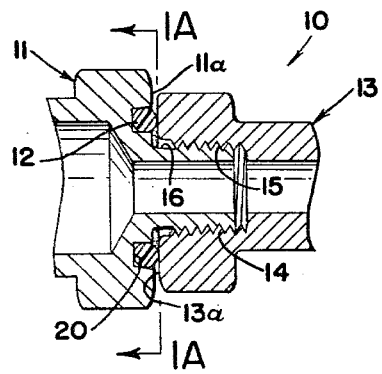
FIG. 1 is a side elevational view in section of one form of tube fitting embodying the invention.
Figure 1A:
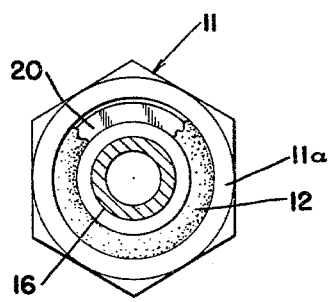
FIG. 1A is a section on line 1A—1A of FIG. 1.

It is to be understood that the invention is not limited to the details of construction and arrangements of parts shown in the drawings and hereinafter described in detail, but is capable of being otherwise embodied and of being practiced or carried out in various ways. It is to be further understood that the phraseology or terminology employed herein is for the purpose of description and there is no intention to herein limit the invention beyond the requirements of the prior art.

Referring to FIG. 1, the invention is shown embodied in a tube fitting, indicated generally by the reference numeral 10, comprising a male member 11 carrying a sealing ring 12 threaded into a female member 13.

More particularly, the male member 11 has tapered pipe threads 14 cut on one end thereof having a smaller pitch diameter than is normally required for mating female tapered pipe threads such as the female tapered pipe threads 15 cut in one end of the female member 13. Preferably, the pitch diameter of the male pipe threads 14 can be at least as much as a gauge smaller than that normally required. This assures the user that the male member 11 can be threaded into the female member 13 in spite of the fact that there may be imperfect threads present.

The number of male threads 14 is less than the number of female threads 15 due to the presence of a relatively broad annular relief groove or recess 16 that is formed on the inner end of the male threads 14. Where machined straight or bolt-type threads are provided, there is usually a thread runout. This is not ordinarily the case in the cutting of tapered pipe threads. The presence of the recess 16 in combination with the tapered male pipe threads 14, having a reduced pitch diameter, permits the male member 11 to be threaded into the female member 13 sufficiently far so that an annular radially extending shoulder or face 11a of the male member 11 is brought to bear against a complementary annular radially extending shoulder or face 13a of the female member 13.

As a result, the interposition of the sealing ring 12, which is preferably an O-ring of suitable material, such as rubber-like or metallic neoprene, between the faces 11a, 13a and the compression thereof between the faces 11a, 13 will effect a fluid-tight seal. This seal of the joint between the members 11, 13 is capable of withstanding high fluid pressures or vacuums without being aided or complemented by a normal tapered pipe threaded coupling which has been sealed with pipe thread sealing compound such as pipe dope or goop. As pointed out, the presence of pipe dope or goop is undesirable in many fluid systems and more especially undesirable in drinking water conduits.

The elimination of a tailor-made or custom fitted tapered pipe joint and the substitution of a pipe joint utilizing a standard tapered thread connection clearly provides a more economical fitting.

Another important feature of the invention is the provision of an annular gasket groove 20 capable of retaining the gasket 12 in assembly therewith during the disassembly of the members 11, 13. The groove 20, FIG. 1, is trapezoidally-shaped in cross section with the bottom wall being parallel to the end face 11a of the male member 11 and the inner side wall being perpendicular to both the bottom wall and the face 11a. However, the outer side wall of the groove 20 is slightly tapered outwardly and is therefore disposed at an acute angle with the inner side wall. The amount of taper of the outer side wall is sufficient to permit the O-ring or gasket 12 to be easily pressed into the groove 20 and frictionally retained therein. The taper will vary with the dimensions of the groove 20 and the size of the O-ring 12, as will be understood to one skilled in that art.

Other groove configurations have also appeared to be suitable such as the configurations of the annular grooves 22, 23, 24 and 25 shown in FIGS. 2-5, respectively.

Figure 2:
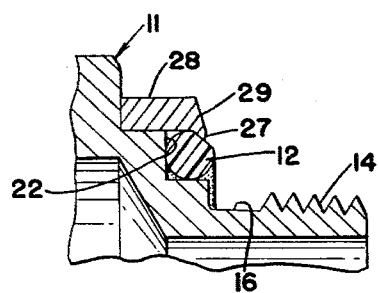
FIGS. 2–5 are each side elevational views in section of modifications of the invention.

More particularly, the groove 22, FIG. 2, has a bottom wall perpendicular to the longitudinal axis of the male member 11 and an inner side wall perpendicular to the bottom wall and parallel to the longitudinal axis. However, the outer side wall, in this embodiment, has a radially inwardly extending lip 27 for retaining the O-ring 12 in place.

Due to the problems of machining or otherwise forming the groove 22, the outer side wall of the groove 22 is formed by a separate annular ring 28 which is telescoped over a cylindrical portion of the member 11. Thus, the member 11 is made of two parts 11, 28. Preferably the end face 29 of the ring 28 is frusto-conical in configuration so that it tapers inwardly towards the threads 14.

Figure 3:
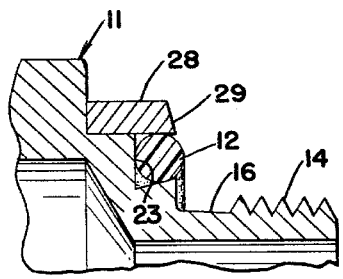

The modification appearing in FIG. 3 is also preferably a two part affair so that the novel-shaped groove 23 can be effected without difficulty or extra expense. The bottom wall of the groove 23 is perpendicular to the longitudinal axis of the male member 11 and the outer side wall is perpendicular to the bottom wall and parallel to the longitudinal axis. However, the inner side wall of the groove 23 is back tapered or tapered towards the mouth of the groove opening so as to substantially reduce the size of the mouth opening and operate to retain the O-ring 12 in position. The inner side wall is of a frusto-conical configuration, so that the cross section of the groove 23 is in the shape of a trapezoid.

Figure 4:
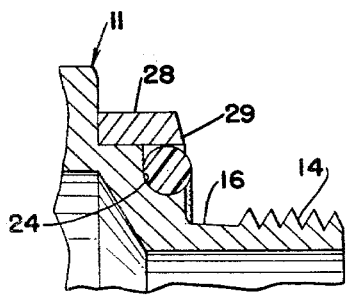

The annular groove 24 in FIG. 4 has an outer side wall parallel to the longitudinal axis of the male member 11 but the balance of the groove 24 is comprised of a semi-circular configuration designed to substantially conform to the arcuate contour of the O-ring 12, except at the point of junction with the member 28 which forms the outer side wall. At the junction, the arcuate contour of the groove 24 straightens out to intersect the outer side wall at right angles so that part of the bottom wall is flat.

Figure 5:
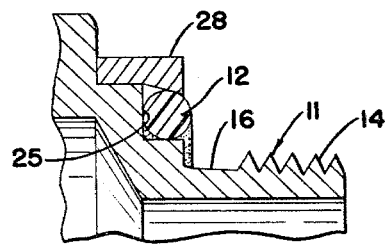

The embodiment of FIG. 5 shows a groove 25 which is similar to the groove 23 in FIG. 3. However, in this instance, the back taper, which operates to hold the O-ring 12 in place, is on the outer ring 28. The cross-sectional configuration of the groove 25 is in the shape of a trapezoid as in groove 23. Also the bottom and inner side walls are disposed at right angles to each other with the bottom wall being perpendicular to the longitudinal axis of the male member 11. In each of the embodiments of FIGS. 2 through 5, it is evident that the mouth of the grooves 22, 23, 24, or 25, respectively, is lesser or greater in diameter than the respective outer or inner diameters of the O-ring 12, in order to hold the O-ring 12 in the grooves 22, 23, 24, or 25.

It is to be understood that the male members in FIGS. 2-5 can be made of two parts, as described, or of one integral part depending upon the desires of the manufacturer.

It is the intention to hereby cover not only the above mentioned modifications of the preferred construction shown, but all adaptations, modifications, and uses thereof which come within the practice of those skilled in the art to which the invention relates, and the scope of the appended claim.

We claim:

A coupling assembly comprising
(a) a male coupling member
(b) a female member adapted to mate with said male member
(c) external pipe threads on the male coupling member
(d) internal pipe threads on the female coupling member, said threads mating with the external threads on the male coupling member
(e) a radially disposed flange on the male coupling member
(f) a mating sealing surface on the female member
(g) the flange on the male coupling member having a face in opposition to the mating sealing surface on the female member
(h) an annular groove in said face, opening toward the sealing surface on the female member, and being concentric with the axis of the male member
(i) annular O-ring sealing means received in the annular groove
(j) the female member being so threaded and axially proportioned and constructed that, when assembled over said male member, the sealing surface of said female member may abut the flange on the male member.
(k) the annular groove comprising a radially disposed bottom wall portion forming the base of the groove
(l) the annular groove further comprising a generally axially disposed side wall portion extending from the bottom wall portion toward the face of the flange in the male member
(m) a cylindrical surface on said male member radially outwardly of said annular groove with said bottom wall portion terminating at its radially outermost portion at said cylindrical surface
(n) an axially extending annular ring frictionally telescoped over said cylindrical surface with a portion of said ring extending over the groove and having an axial extent such that one end of said ring is in substantially radial alignment with said flange whereby the inner wall of said portion of said ring and said side wall portion form the mouth of the groove
(o) one of said inner wall and said side wall being essentially parallel to the axis of the male member and the other of said inner wall and said side wall being at an angle to the axis of the male member
(p) said side wall having at the mouth of the annular groove a diameter that is materially larger than the largest external thread of the male member
(q) the O-ring sealing means having in its natural, undistorted, unstretched state an inside diameter that is materially larger than the largest external thread of the male member and having dimensions compatible with the dimensions of the annular groove for proper, normal sealing against the sealing surface of the female member and further including a cross-sectional diameter which exceeds the axial depth of the annular groove.

References Cited in the file of this patent

UNITED STATES PATENTS

| | | |
|---|---|---|
| 489,107 | Storz | Jan. 3, 1893 |
| 2,311,009 | Urquhart | Feb. 16, 1943 |
| 2,373,253 | Martin | Apr. 10, 1945 |
| 2,552,686 | Melcher | May 15, 1951 |
| 2,937,891 | Gressel | May 24, 1960 |

FOREIGN PATENTS

| | | |
|---|---|---|
| 1,063,620 | France | Dec. 16, 1953 |
| 824,160 | Germany | Dec. 10, 1951 |